(12) United States Patent
Cao

(10) Patent No.: US 6,396,607 B1
(45) Date of Patent: *May 28, 2002

(54) MULTI-WAVELENGTH ALL-OPTICAL REGENERATORS (MARS)

(75) Inventor: Xiang-Dong Cao, Boynton Beach, FL (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,252

(22) Filed: Jun. 30, 1998

(51) Int. Cl.[7] ................................................ H04B 10/00
(52) U.S. Cl. ...................... 359/158; 359/174; 359/176; 359/177; 359/179; 359/348; 359/349
(58) Field of Search ........................ 359/158, 174–179, 359/348–349

(56) References Cited

U.S. PATENT DOCUMENTS

| | | | | |
|---|---|---|---|---|
| 5,309,267 A | * | 5/1994 | Huang .......................... 359/139 |
| 5,369,520 A | * | 11/1994 | Avramopoulos et al. ..... 359/176 |
| 5,473,719 A | * | 12/1995 | Stone .......................... 359/123 |
| 5,572,350 A | * | 11/1996 | Spanke .......................... 359/140 |
| 5,673,133 A | * | 9/1997 | Imaoka et al. ............... 359/189 |
| 5,754,325 A | * | 5/1998 | Michishita .................. 359/176 |
| 5,757,529 A | * | 5/1998 | Desurvire et al. ........... 359/179 |
| 5,760,948 A | * | 6/1998 | Bigo ........................... 359/326 |
| 5,764,396 A | * | 6/1998 | Yoneyama ................... 359/176 |
| 5,857,040 A | * | 1/1999 | Bigo et al. ...................... 385/15 |
| 5,917,633 A | * | 6/1999 | Gambini et al. ............. 359/158 |
| 6,028,685 A | * | 2/2000 | Caridi et al. ................. 359/123 |

* cited by examiner

Primary Examiner—Leslie Pascal
Assistant Examiner—Hanh Phan (57) ABSTRACT

In an optical regenerator for use in an optical transmission system, an optical input signal to the regenerator comprising N wavelength division multiplexed channel signals is received in a signal synchronizing arrangement which synchronizes the phase of all of the N channels, where N·2. An optical output signal from the signal synchronizing arrangement has N phase-synchronized wavelength division multiplexed channels and is provided as an optical input signal to a nonlinear optical loop mirror (NOLM) arrangement. The NOLM has a high nonlinearity fiber loop that propagates equal parts of the optical input signal from the signal synchronizing arrangement in both a clockwise (CW) and a counterclockwise (CCW) direction. An optical clock signal from a laser having a phase that matches the phase of the CW and CCW propagating signals is multiplexed with the CW signal to provide a 180 degree phase shift between the CW and CCW propagating signals while propagating in the optical fiber loop. The NOLM retimes and reshapes the optical pulses of the optical synchronized N wavelength division multiplexed channels, and generates a corresponding optical NOLM output signal to an Erbium-doped fiber amplifier (EDFA). The EDFA amplifies the NOLM output signal, and generates an amplified and phase-synchronized optical N wavelength division multiplexed channel output signal that is transmitted from the optical regenerator.

30 Claims, 2 Drawing Sheets

MULTI-WAVELENGTH ALL-OPTICAL REGENERATORS (MARS)

FIELD OF THE INVENTION

The present invention relates to multi-wavelength, all-optical, regenerators for use in high speed optical communication systems, and to a method for regenerating an optical N wavelength division multiplexed channel signal received by a regenerator.

BACKGROUND OF THE INVENTION

Conventional regenerators that are used in optical networks convert received optical signals to electronic signals and then back to optical signals for transmission to a next regenerator or terminal station. The problem with such conventional type of regenerators is that they have a bandwidth which is limited to 10 gigahertz and each channel has to be processed on a channel-by-channel basis. As point-to-point transmission speeds in communication systems approach 10 gigabits/second (e.g., in OC-192 systems) and beyond, it is highly desirable to use all-optical regenerators to extend transmission distances between regenerators (repeaters) instead of using the conventional type of regenerators that convert received optical signals to electronic signals and then back to optical signals. From a network point of view, the conventional electronic type of regenerators become bottlenecks for high capacity optical networks. In contrast, all-optical regenerators can provide a larger bandwidth and have many advantages when considering network scalability, management, and capacity. Therefore, all-optical regenerators will be key components for future all-optical communication networks.

It is desirable to provide a regenerator system and a method which simultaneously reamplifies, retimes, and reshapes received multiple wavelength division multiplexed channels entirely in the optical domain before retransmission along a next section of an optical communication system.

SUMMARY OF THE INVENTION

The present invention is directed to multi-wavelength all-optical regenerators, where each regenerator reamplifies, retimes, and reshapes multiple wavelength channels in a received N wavelength division multiplexed optical channel signal entirely in the optical domain.

Viewed from one aspect, the present invention is directed to an optical regenerator for use in an optical transmission system comprising an optical N wavelength division multiplexed channel signal synchronizing arrangement, an optical pulse retiming and reshaping arrangement comprising a nonlinear optical loop mirror (NOLM) arrangement, and an Erbium-doped fiber amplifier (EDFA). The optical N wavelength division multiplexed channel signal synchronizing arrangement is responsive to the reception of an optical input signal to the regenerator comprising N wavelength division multiplexed channel signals for synchronizing the phase of all of the N channel signals, and for generating an optical output signal comprising synchronized N wavelength division multiplexed channel signals, where N·2. The nonlinear optical loop mirror (NOLM) arrangement in the optical pulse retiming and reshaping arrangement is responsive to the optical output signal from the signal synchronizing arrangement for retiming and reshaping optical pulses of the optical synchronized N wavelength division multiplexed channel signals, and for generating a corresponding optical NOLM output signal. The Erbium-doped fiber amplifier (EDFA) amplifies the optical NOLM output signal, and generates an amplified and phase-synchronized optical N wavelength division multiplexed channel output signal for transmission as an output signal from the optical regenerator.

Viewed from another aspect, the present invention is directed to an optical regenerator for use in an optical transmission system comprising an optical wavelength division demultiplexer (WDD), a plurality of N−1 selectively changeable optical delays, an optical wavelength division multiplexer (WDM), an optical pulse retiming and reshaping arrangement comprising a nonlinear optical loop mirror (NOLM) arrangement, and an Erbium-doped fiber amplifier (EDFA), where N·2. The WDD is responsive to an optical input signal to the regenerator comprising N wavelength division multiplexed channels for directing the N channels onto separate N output paths. Each of the plurality of N−1 selectively changeable optical delays is coupled in a separate predetermined one of N−1 output paths of the WDD. Still further, each selectively changeable optical delay is responsive to a delay control signal for selectively adjusting the phase of the channel signal propagating in an associated one of an N−1 output path so that all N−1 optical channel signals are synchronized in phase with an Nth optical channel signal. The WDM multiplexes the Nth optical channel signal and the N−1 optical channel signals from the plurality of N−1 optical delays into a synchronized N wavelength division multiplexed channel optical output signal. The phase controller is responsive to a portion of the output signal from the WDM for detecting a phase difference between the Nth channel signal and each of the remaining N−1 delayed channel signals. In turn, the phase controller generates a separate delay control signal to each of the optical delays for synchronizing the phase of each of the N−1 delayed optical channel signals to the phase of the Nth optical channel signal. The optical pulse retiming and reshaping arrangement comprising a nonlinear optical loop mirror (NOLM) arrangement which is responsive to the optical output signal from the WDM for retiming and reshaping optical pulses of the optical synchronized N wavelength division multiplexed channel signals and for generating a corresponding optical NOLM output signal. The EDFA amplifies the NOLM output signal, and generates an amplified and phase-synchronized optical N wavelength division multiplexed channel output signal for transmission as an output signal from the optical regenerator.

Viewed from still another aspect, the present invention is directed to an optical regenerator for use in an optical transmission system comprising an optical N wavelength division multiplexed channel signal synchronizing arrangement, an Erbium-doped fiber amplifier (EDFA), and an optical pulse retiming and reshaping arrangement comprising a nonlinear optical loop mirror (NOLM) arrangement, a clock recovery circuit, and a laser. The optical N wavelength division multiplexed channel signal synchronizing arrangement is responsive to the reception of an optical input signal to the regenerator comprising N wavelength division multiplexed channels for synchronizing the phase of all of the N channel signals, and for generating an optical synchronized N wavelength division multiplexed channel output signal, where N·2. The nonlinear optical loop mirror (NOLM) arrangement is responsive to the optical output signal from the signal synchronizing arrangement for retiming and reshaping optical pulses of the N channel signals, and for generating a corresponding optical NOLM output signal. The clock recovery circuit is responsive to a predetermined one of the N channel signals propagating in the optical synchronizing arrangement for generating a clock output signal having a frequency corresponding to the bit rate frequency of the predetermined one of the N channel signals. The clock recovery circuit is also responsive to an output signal from the optical regenerator comprising N phase-synchronized optical N channel signals for synchronizing the phase of the clock output signal to the phase of the N channel signals in the output signal from the optical regenerator. The laser is responsive to the clock output signal from the clock recovery circuit for generating a corresponding optical clock output signal which is coupled into the NOLM. The Erbium-doped fiber amplifier (EDFA) is used to amplify the optical NOLM output signal, and generate an amplified and phase-synchronized optical N wavelength division multiplexed channel output signal for transmission as the output signal from the optical regenerator.

Viewed from still another aspect, the present invention is directed to a method of regenerating a received optical N wavelength division multiplexed channel signal in an optical regenerator of an optical transmission system, where $N \cdot 2$, comprising the following steps. In a first step, the phase of all of the N channel signals in the received optical N wavelength division multiplexed channel signal are concurrently and separately synchronized for generating an optical output signal comprising N synchronized wavelength division multiplexed channel signals. In a second step, the optical output signal from step (a) is split into two halves in an optical coupler so that a first half propagates in a first direction around an optical fiber loop wherein at least a portion thereof comprises a high nonlinearity optical fiber section and a second half propagates in a second opposite direction around the optical fiber loop. In a third step, an optical clock output signal from a laser is multiplexed with the first half signal propagating in the first direction in the optical fiber loop in the second step in an optical wavelength division multiplexer. This shifts the phase of the first half signal in the optical fiber loop by a predetermined amount and causes the first and second halves of the N channel signals to be switched out of a second port of the optical coupler as a NOLM output signal when the two halves return to the entry point of the optical fiber loop. In a fourth step, the optical NOLM output signal from the third step is amplified in an Erbium-doped fiber amplifier (EDFA) for generating an amplified and phase-synchronized optical N wavelength division multiplexed channel output signal for transmission as an output signal from the optical regenerator.

The invention will be better understood from the following more detailed description taken with the accompanying drawings and claims.

DETAILED DESCRIPTION

Figure 1:
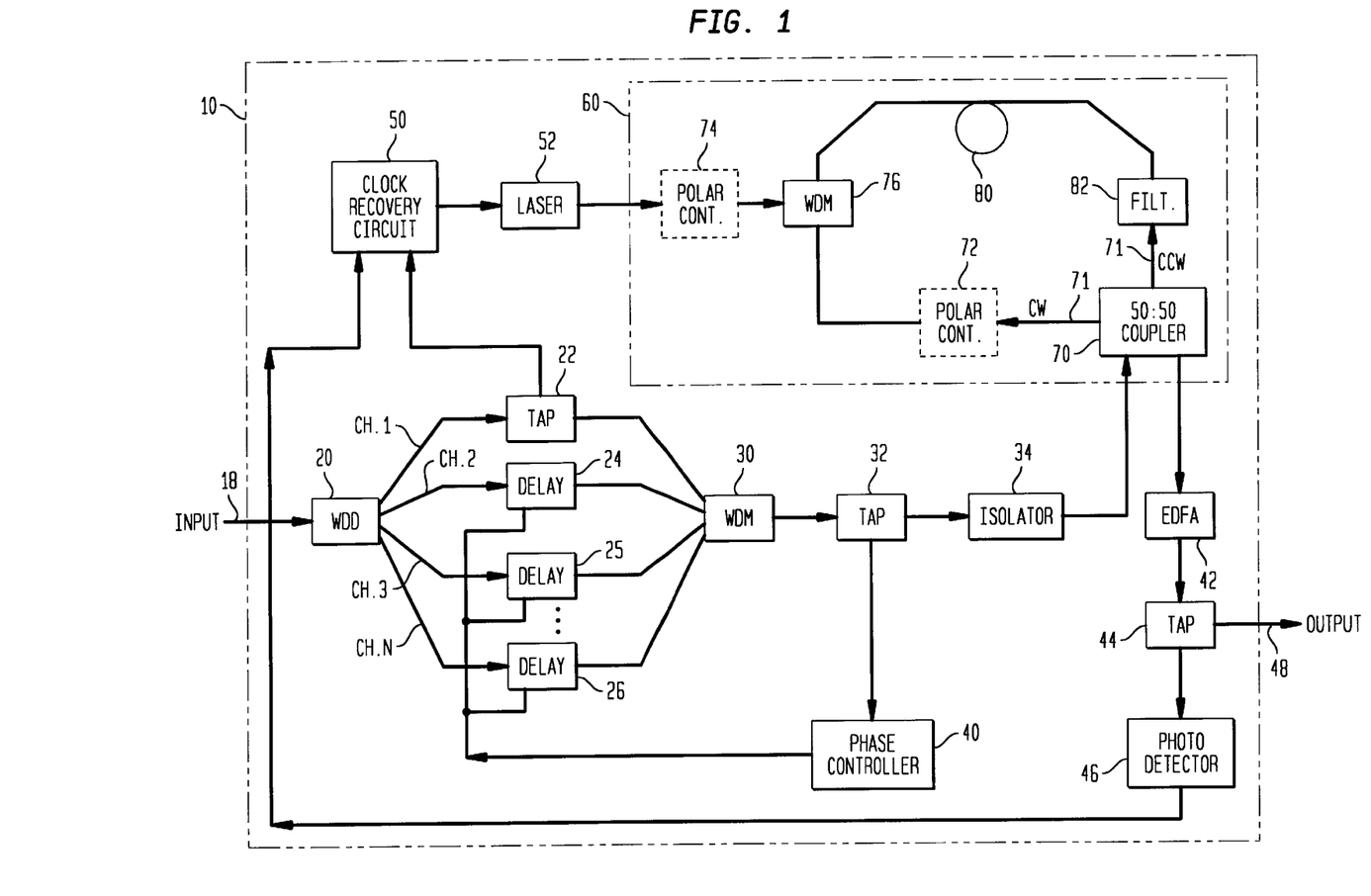
FIG. 1 shows a block diagram of a multi-wavelength, all-optical, regenerator system (MARS) in accordance with the present invention.

Referring now to FIG. 1, there is shown a block diagram of a multi-wavelength, all-optical, regenerator system (MARS) 10 (shown within a dashed line rectangle) in accordance with the present invention. The MARS 10 is a photonic device that simultaneously performs the functions of reamplification, retiming, and reshaping of N wavelength division multiplexed channels in the optical domain without converting the received signal format from an optical signal to an electronic signal and back to an optical signal (a so-called o-e-o conversion) before retransmission along another section of an optical communication system.

The MARS 10 comprises an optical wavelength division demultiplexer (WDD) 20, first, second, and third optical taps 22, 32, and 44, respectively, a plurality of N–1 selectively changeable optical delays (DELAY) (of which only three delays 24, 25, and 26 are shown), an optical wavelength division multiplexer (WDM) 30, an optical isolator 34, a phase controller 40, an Erbium-doped fiber amplifier (EDFA) 42, a clock recovery circuit 50, a laser 52, and a nonlinear optical loop mirror (NOLM) 60 (shown within a dashed line rectangle). The combination of the WDD 20, the first and second optical taps 22 and 32, the plurality of N–1 selectively changeable optical delays 24, 25, and 26, the WDM 30, and the phase controller 40 can be considered as a signal synchronizing arrangement. Similarly, the combination of the clock recovery circuit 50, the laser 52, and the NOLM 60 can be considered as a pulse retiming and reshaping arrangement. The NOLM 60 comprises a 50:50 coupler 70 that is coupled to both ends of a nonlinear optical loop 71. The nonlinear optical loop 71 provides a serial coupling of a optional first polarization controller (POLAR. CONT.) 72 (shown within a dashed line rectangle), an optical wavelength division multiplexer (WDM) 76, a loop of a dispersion-shifting high nonlinearity fiber 80, and a filter (FILT.) 82. The NOLM 60 further comprises a second optional polarization controller (POLAR. CONT.) 74 (shown within a dashed line rectangle) which couples an output of the laser 52 to an input of the WDM 76.

In the MARS 10, an optical input signal comprising N wavelength division multiplexed channels is provided at an input 18 as an input to the WDD 20, where N can comprise any base 2 integer such as 4, 8, 16, 32, etc. However, for purposes of explanation hereinafter, it is assumed that N=4. The WDD 20 is a wavelength division demultiplexer which directs the N wavelength division multiplexed channels along N separate output paths. A first channel (CH.1) of the N wavelength division multiplexed channels, which is hereinafter considered as a reference channel, is directed to an input of the first optical tap 22. The second channel (CH.2), the third channel (CH.3), and the Nth channel (CH.N) of the N wavelength division multiplexed channels are directed to inputs of the first optical delay 24, the second optical delay 25, and the third optical delay 26, respectively. A first output from the first optical tap 22 is coupled to a first input of the clock recovery circuit 50. A second output from the first optical tap 22, and outputs from the first, second, and third selectively changeable optical delays 24, 25, and 26 are multiplexed in the wavelength division multiplexer (WDM) 30 to generate an output signal comprising N phase synchronized wavelength division multiplexed channels. The output signal from the WDM 30 is coupled to an input of the second optical tap 32.

A first output of the second optical tap 32 is coupled to an input of the phase controller 40 to divert a small amount (e.g., 2%) of the output signal from the WDM 30 to the phase controller 40 as an error control signal. Separate N–1 outputs from the phase controller 40 are coupled to separate ones of the first, second, and third selectively changeable optical delays 24, 25, and 26. The phase controller 40 is responsive to the error control signal received from the second optical tap 32 to generate separate delay control signals to each of the first, second, and third selectively changeable optical delays 24, 25, and 26. A second output of the second optical tap 32 is coupled to an input of the optical isolator 34, and an output of the optical isolator 34 is coupled to the NOLM 60 via a first port of the 50:50 optical coupler 70.

A second port of the 50:50 optical coupler 70 is coupled to an input of the Erbium-doped fiber amplifier (EDFA) 42 which generates an amplified output signal that is coupled to an input of the third optical tap 44. The third optical tap 44 directs a small portion (e.g., 2%) of the output signal from the EDFA 42 to the photodetector 46, and the remaining portion of the output signal from the EDFA 42 as an amplified and synchronized N wavelength division multiplexed optical output signal from the MARS 10 on optical fiber 48. The photodetector 46 converts the received portion of the N wavelength division multiplexed optical output signal into a corresponding electrical control signal which is coupled to an second input of the clock recovery circuit 50. An output of the clock recovery circuit 50 is coupled to a control input of the laser 52. The laser 52 is preferably a continuous wave laser which has its frequency and phase controlled by a control signal from the clock recovery circuit 50. The output from the laser 52 is coupled to the WDM 76 via the optional polarization controller (POLAR. CONT.) 74 of the NOLM 60.

In an operation of the MARS 10, the input optical signal comprising N different wavelength division multiplexed channels from input 18 is provided as an input to the WDD 20, where the N channels are separated and directed to the first optical tap 22, and the first, second, and third selectively changeable optical delays 24, 25, and 26, respectively. In the first, second, and third delays 24, 25, and 26, control signals generated in the phase controller 40 cause the phase of each of the second-to-N channels of the input signal to be synchronized to the phase of the reference channel (CH.1) before being multiplexed and recombined in the WDM 30. An error control signal from the second optical tap 32 is used by the phase controller 40 to determine any phase differences between each of the second-to-N channels and the first channel. If any phase differences are detected, the phase controller 40 generates appropriate control signals to the first, second, and third selectively changeable optical delays 24, 25, and 26 to cause the phases of all of the N channels to be synchronized. An exemplary arrangement of the phase controller 40 will be discussed hereinafter in relation to FIG. 2.

The synchronized and recombined N channels from the WDM 30 are coupled to the 50:50 optical coupler 70 of the NOLM 60 via the second optical tap 32 and the isolator 34. The isolator 34 is used to block any signals from the NOLM 70 from propagating back towards the input 18 of the MARS 10.

In the NOLM 60, the synchronized and recombined N channel input signal is split into two parts by the 50:50 optical coupler 70. A first part of the split signal propagates in a clockwise (CW) direction in the nonlinear optical loop 71, while the second part of the split signal propagates in a counterclockwise (CCW) direction in the nonlinear optical loop 71. Both the first part (CW) and second part (CCW) of the input signal propagate through physically the same path in the nonlinear optical loop 71. Without the introduction of the clock signal from the laser 52, the two parts of the input signal will still be in phase when they reach the 50:50 optical coupler 70 after traversing the loop 71. Under such condition, the first and second parts would be switched out of the 50:50 combiner 70 back towards the input 18 of the MARS 10. The isolator 34, in turn, would block any signal from the 50:50 combiner 70 from propagating back towards the input 18 of the MARS 10.

However, a phase shift (e.g., D or 180 degrees) can be introduced into the first (CW) propagating signal when the local controlled laser 52 is coupled into the NOLM 60 via the WDM 76 and co-propagates with the first (CW) signal. This is due to a cross-phase modulation occurring between the control laser 52 and the first (CW) propagating signal. More particularly, the clock signal from the laser 52 cause a phase modulation (shifts the phase) of the first CW signal. The amount of phase modulation or shifting of the phase of the first CW signal is dependent on the power of clock signal from the laser 52. The dispersion-shifted high nonlinearity optical fiber coil 80 inside the loop 71 is used to increase the normal nonlinear phase shift. This enhancing of the phase shift or phase modulation of the first CW signal permits a decreasing of the power needed of the control laser 52 to cause a same amount of phase shift. Since the wavelength of the optical signal from the control laser 52 is different from the wavelengths of the N channel signals propagating the CW direction, a 2×1 WDM 76 is used to couple the signal from laser 52 into the loop 71. The filter 82 is arranged to pass the N channel signals propagating in the CW and CCW directions and block any of the signal of the control laser 52 from reaching the 50:50 optical coupler 70.

When the first CW signal and the second CW signal are 180 degrees out of phase on returning to the 50:50 coupler 70, the two signals from the loop 71 are not switched out towards the input 18 of the MARS 10. Instead, the two signals from the loop 71 are switched out of the other port of the 50:50 optical combiner 70 and coupled to an input of the Erbium-doped fiber amplifier (EDFA) 42. If some small portion of the two signals from the loop 71 is switched out of the 50:50 coupler 70 towards the input 18 of the MARS 10 because the two signals are not exactly 180 degrees out of phase, the isolator 34 blocks such signal from reaching the input 18 of the MARS 10. The EDFA 42 amplifies the output signal from the 50:50 optical combiner 70 by a predetermined amount and generates an output signal that is coupled to an input of the third optical tap 44. The third optical tap 44 diverts a small portion (e.g., 2%) of the amplified optical signal from the EDFA 42 to the photodetector 46, and the remaining amplified optical signal as the output from the MARS 10 for transmission along an output optical fiber 48. The photodetector 46 converts the optical signal received from the third optical tap 44 into a corresponding electrical control signal to the clock recovery circuit 50.

The clock recovery circuit 50 is responsive to the portion of the channel 1 signal obtained from the first optical tap 22 to generate an output clock signal that has a same frequency (bit rate) as the pulses of the channel 1 signal. The electrical control signal from the photodetector 46 is used by the clock recovery circuit 50 to adjust the phase of the output clock signal so as to match the phase of the N synchronized wavelength division multiplexed signal obtained from the output of the MARS 10. More particularly, the phase of the clock generated by the clock recovery circuit 50 is adjusted in such a way by the electrical control signal from the photodetector 46 that the output clock signal from the clock recovery circuit 50 is at a maximum value. Such maximum value of the output clock signal corresponds to an in-phase condition between the control laser 52 and the synchronized and amplified N division multiplexed channel signals at the output of the MARS 10. The output clock signal from the clock recovery circuit 50 is used to directly drive the laser 52, which is then used to switch out the synchronized clock and N channel signals from the NOLM 60 to the EDFA 42. In this manner, the laser output signal is in phase with the first CW N channel signal propagating in the loop 71 of the NOLM 60.

The polarization controllers 72 and 74 are optional devices and are used only if switching of the synchronized N division multiplexed channels out of the NOLM 60 is dependent on polarization states of the signals. When the NOLM 60 is polarization dependent, then the polarization controllers 72 and 74 are used to optimize the extinction ratio and the efficiency of the nonlinear transmissions in the loop 71. More particularly, when a field in the loop 71 of the NOLM 60 produces some birefringence (double refraction) therein, the polarization controllers 72 and 74 are needed to properly optically bias the switching of the NOLM 60. Since the polarization state within the loop 71 does not depend on the conditions of the input signal, once the optical bias within the NOLM 60 is properly adjusted, the bias and the loop 71 is stabilized and the bias remains fixed. Because of such optical biasing to control the polarization state in the loop 71, the efficiency of the nonlinear transmissions from the loop to the EDFA 42 are improved. However, when the design of the NOLM 60 is made polarization insensitive, then the optional polarization controllers 72 and 74 are not required.

In accordance with the present invention, all output signals from the MARS 10 are retimed by a retiming arrangement comprising the clock recovery circuit 50 and the laser 52 to have a same timing as the clock generated in the clock recovery circuit 50, and thereby cause any timing jitter in the input signal to the MARS 10 to be corrected. Still further, the pulse amplitudes of all of the N channel signals are restored to a predetermined level by using the EDFA 42 at the output of the NOLM 60. Additionally, since the switching timing window is determined by the pulses of the control laser 52, the switched out pulses will have a same pulse shape as the pulse of the control laser 52. Therefore, the output pulses from the MARS 10 are reshaped according to the pulse shape of the control laser 52. By a proper design of the NOLM 60 and the waveform of the control laser 52, the output pulse shape from the MARS 10 can be adjusted to optimize the system performance of the MARS 10.

Other advantages can be obtained from the design of the MARS 10. A first advantage is that any noise in each channel is reduced by the NOLM 60, which is a well known property of a NOLM. More particularly, the NOLM 60 operates as a timing gate, where it opens periodically at times when the MARKS (or 1's) of each channel arrive, and closes in between. Therefore, any noise between MARKS will be blocked out.

A second advantage is that in order to optimize the system performance, there exists an optimal frequency chirp for a best Q factor, or an equivalent bit error rate (BER). In the MARS 10, it is possible to control the chirp of the output signal from the MARS 10 by adjusting the power level of the control laser 52. More particularly, modifying the switching power of the laser 52 is strictly done at the laser S2 and not within the loop 71 since the loop 71 is a passive device. If the control laser 52 is stronger than required, it will introduce a larger phase shift between the two oppositely propagating N channel signals. Any phase difference between the two oppositely propagating N channel signals is proportional to the power of the laser 52. The higher the power of the laser 52, the larger the phase difference that is introduced. Two effects occur—first, there is an intense demodulation because of the interference effect, and second, there is also a phase factor which chirps the pulses. By controlling the laser power, the amount of chirp and the transmission from the NOLM 60 will be controlled. Chirp indicates that the frequency across a pulse is not uniform because the frequency changes over time across the pulse. For example, when a pulse is launched through a chromatic dispersant element such as an optical fiber, the pulse will become chirped because the lower frequency portion moves faster when compared to the higher frequency portion. Therefore, the leading edge of the pulse has a lower frequency than the trailing edge of the pulse and is referred to as a "chirp".

A third advantage is that (a) the input signal to the MARS 10 can either be a NonReturn to Zero (NRZ) or Return to Zero (RZ) format, or (b) the output signal format from the MARS 10 can be a RZ format or quasi RZ format. Since the RZ format provides better performance than the NRZ format for OC-192 systems and beyond, the MARS 10 is able to optimize an existing NRZ transmission performance by modifying the pulse format to a quasi NRZ. The built-in chirp control function available in the MARS 10 is also very useful in dealing with high chromatic dispersion. Still further, the MARS 10 is also compatible with solitron systems.

Figure 2:
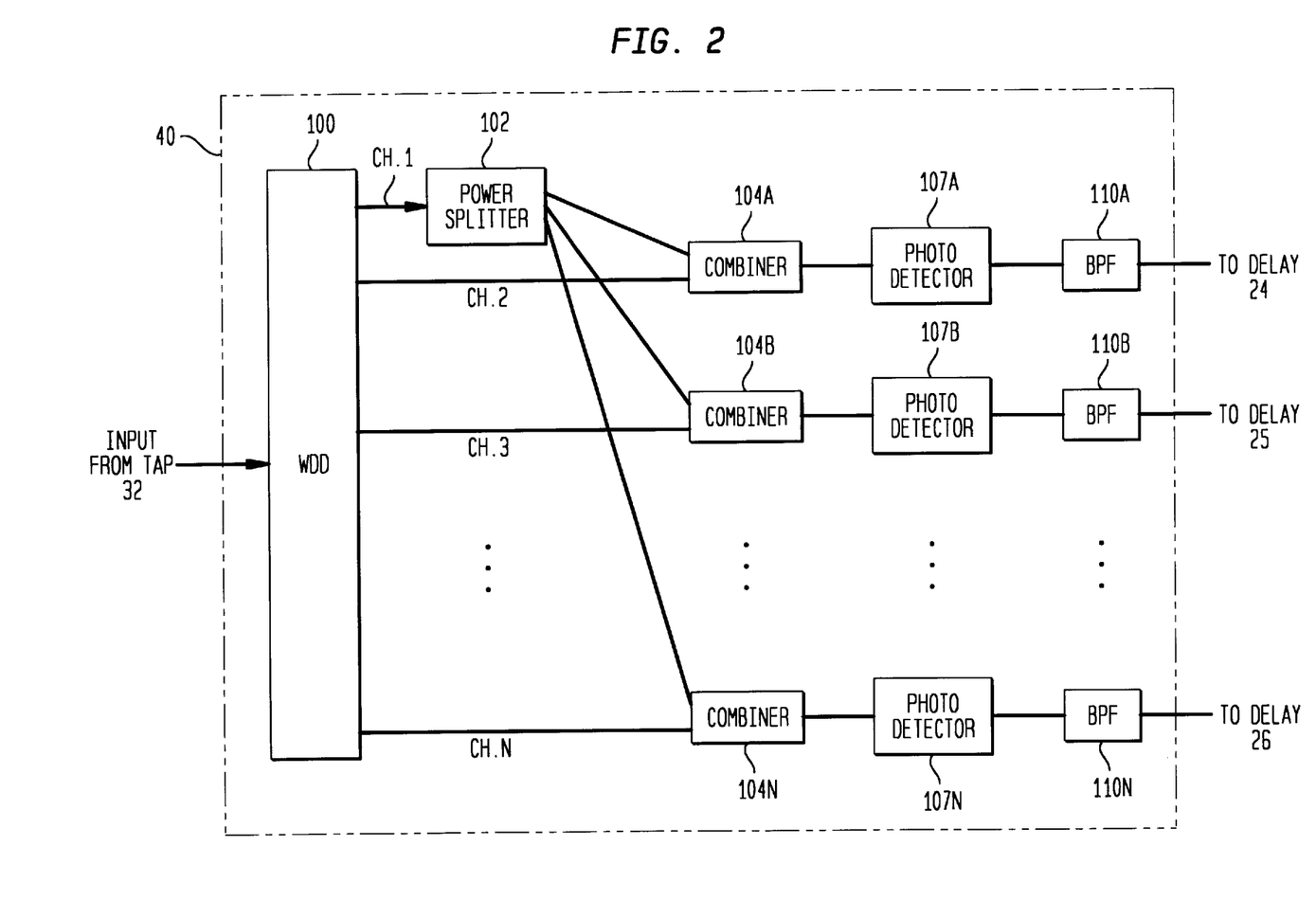
FIG. 2 is a block diagram of a phase controller for use in the multi-wavelength, all-optical, regenerator system (MARS) of FIG. 1 in accordance with the present invention.

Referring now to FIG. 2, there is shown a block diagram of an exemplary arrangement of a block diagram of a phase controller 40 (shown within a dashed line rectangle) for use in the multi-wavelength, all-optical, regenerator system (MARS) of FIG. 1 in accordance with the;present invention. The phase controller 40 comprises an optical wavelength division demultiplexer (WDD) 100, a power splitter 102, a plurality of N−1 optical combiners (of which only first, second, and third optical combiners 104A, 104B, and 104N, respectively, are shown), a plurality of N−1 photodetectors (of which only first, second, and third photodetectors 107A, 107B, and 107N, respectively, are shown), and a plurality of N−1 bandpass filters (BPF) (of which only first, second, and third bandpass filters 110A, 110B, and 110N, respectively, are shown). For purposes of discussion hereinafter, it is assumed that N=4. An N synchronized wavelength division multiplexed channel signal from the second optical tap 32 of the MARS 10 of FIG. 1 is provided as an input signal to the WDD 100. The WDD 20 is a wavelength division demultiplexer which separates the N channels and directs the N different wavelength division multiplexed channels along N separate output paths. A first channel (CH.1), which is hereinafter considered as a reference channel, is directed along a first path to an input of the power splitter 102. The power splitter 102 divides the first channel signal into N−1 parts which are coupled to first inputs of separate ones of the optical combiners 104A, 104B, and 104N. The second channel (CH.2) signal from the WDD 100 is coupled to a second input of the optical combiner 104A, the third channel (CH.3) from the WDD 100 is coupled to a second input of the optical combiner 104B, and the Nth channel (CH.N) from the WDD 100 is coupled to a second input of the optical combiner 104N. Outputs from the optical combiners 104A, 104B, and 104N are coupled to inputs of the photodetectors 107A, 107B, and 107N, respectively. Outputs from the photodetectors 107A, 107B, and 107N are coupled to inputs of the BPFs 110A, 110B, and 110N, respectively. The outputs from the BPFs 110A, 110B, and 110N are provided as delay control signals to the first, second, and third optical delays 22, 23, and 24, respectively, of the MARS 10 of FIG. 1.

In operation, the N synchronized wavelength division multiplexed channel signals from the second optical tap 32 of the MARS 10 of FIG. 1 are demultiplexed in the WDD 100. The optical combiner 104A combines the second channel (CH.2) signal from the WDD 100 with the part of the reference channel (CH.1) signal provided by the power splitter 102. The photodetector 107A converts the optical signal from the optical combiner 104A into a corresponding electrical signal which is coupled to the BPF 110A. An output error control signal from the BPF 110A is proportional to a phase error between the demultiplexed channel 2 signal and the reference channel (CH. 1). Each of the combinations of the optical combiner 104B, photodetector 107B, and BPF 110B for the third channel, and the optical combiner 104N, photodetector 107N, and BPF 110N for the Nth channel operate in the same manner as described hereinabove for the combination of the optical combiner 104A, photodetector 107A, and BPF 110A for the second channel. The error control signals from the BPFs 110A, 110B, and 110N are simultaneously fed back to optical delays 22, 23, and 24, respectively, to synchronize the phases of all of the N channels prior to being multiplexed in the WDM 30 (shown in FIG. 1).

It is to be appreciated and understood that the specific embodiments of the present invention described hereinabove are merely illustrative of the general principles of the invention. Various modifications may be made by those skilled in the art which are consistent with the principles set forth.

What is claimed is:

1. An optical regenerator for use in an optical transmission system comprising:
   an optical N wavelength division multiplexed channel signal synchronizing arrangement responsive to the reception of an optical input signal to the regenerator comprising N wavelength division multiplexed channel signals for adaptively synchronizing the phase of all of the N channel signals relative to a predetermined one of the N channel signals, and for generating an optical output signal comprising N synchronized wavelength division multiplexed channel signals, where N·2;
   an optical pulse retiming and reshaping arrangement comprising a nonlinear optical loop mirror (NOLM) arrangement which is responsive to the optical output signal from the signal synchronizing arrangement for retiming and reshaping optical pulses of the optical synchronized N wavelength division multiplexed channel signals, and for generating a corresponding optical NOLM output signal; and
   an Erbium-doped fiber amplifier (EDFA) responsive to the optical NOLM output signal for amplifying the retimed and reshape optical NOLM output signal, and for generating an amplified and phase-synchronized optical N wavelength division multiplexed channel output signal for transmission as an output signal from the optical regenerator.

2. The optical regenerator of claim 1 wherein the optical N wavelength division multiplexed channel signal synchronizing arrangement comprises:
   an optical wavelength division demultiplexer (WDD) responsive to the optical input signal to the regenerator for directing the N wavelength division multiplexed channels onto separate N output paths;
   a plurality of N-1 selectively changeable optical delays coupled in predetermined N-1 output paths of the WDD, each optical delay being responsive to a delay control signal for selectively adjusting the phase of an associated one of the N-1 optical channel signals so that all of the N-1 optical channel signals are synchronized in phase with an Nth optical channel signal;
   an optical wavelength division multiplexer (WDM) for multiplexing the Nth optical channel signal and the N-1 optical channel signals from the plurality of N-1 optical delays to generate a synchronized N wavelength division multiplexed channel optical output signal; and
   a phase controller responsive to a portion of the optical output signal from the WDM for detecting a phase difference between the Nth channel signal and each of the N-1 delayed channel signals, and for generating a separate delay control signal to each of the optical delays for synchronizing the phase of each of the N-1 delayed optical channel signals to the phase of the Nth optical channel signal.

3. The optical regenerator of claim 2 wherein the phase controller comprises:
   a wavelength division demultipexer (WDD) responsive to a portion of the optical output signal from the WDM for directing the N channels onto separate N output paths;
   a power splitter for splitting the power of a first one of the synchronized N wavelength division multiplexed optical channel signals in a first output path from the WDD into N-1 parts;
   a plurality of N-1 optical combiners, each optical combiner combining a separate one of the N-1 parts of the first one of the optical channel signals from the power splitter and a separate one of second-to-N optical channel signals in a second-to-N output path from the WDD for generating an optical output signal corresponding to the combined associated channel signals; and
   a plurality of N-1 filters, each filter being coupled to receive a separate one of the optical output signals from the plurality of N-1 combiners, and to generate a phase error control signal as an output signal to a separate predetermined one of the plurality of N-1 selectively changeable optical delays.

4. The optical regenerator of claim 3 wherein the phase controller further comprises:
   a plurality of N-1 photodetectors, each photodetector being coupled to receive a separate one of the optical output signals from the plurality of N-1 optical combiners, and to convert said separate one of the optical output signals into a corresponding electrical signal; and
   the plurality of N-1 filters are N-1 bandpass filters, each bandpass filter being coupled to receive a separate one of the electrical signals from the plurality of N-1 photodetectors and to generate a phase error control signal as an output signal to a separate predetermined one of the plurality of N-1 selectively changeable optical delays.

5. The optical regenerator of claim 1 wherein the optical pulse retiming and reshaping arrangement further comprises:
   a clock recovery circuit responsive to a predetermined one of the N channel signals propagating in the optical N wavelength division multiplexed channel signal synchronizing arrangement for generating a clock output signal having a frequency corresponding to the bit rate frequency of the predetermined one of the N channel signals, and being responsive to the output signal from the EDFA for synchronizing the phase of the clock output signal to the phase of the output signal from the EDFA; and
   a laser responsive to the clock output signal from the clock recovery circuit for generating a corresponding optical clock output signal which is coupled into the NOLM.

6. The optical regenerator of claim 5 wherein the NOLM comprises:
- an optical fiber loop wherein at least a portion thereof comprises a high nonlinearity optical fiber section;
- an optical coupler for receiving the optical synchronized N wavelength division multiplexed channel output signal from the signal synchronizing arrangement at a first port thereof, and for directing first and second halves of the received synchronized N channel output signal for propagation in first and second opposite directions, respectively, in the optical fiber loop; and
- a wavelength division multiplexer (WDM) for multiplexing the optical clock output signal from the laser with the first half of the optical synchronized N wavelength division multiplexed channel output signal from the signal synchronizing arrangement propagating in the first direction in the optical fiber loop in order to shift the phase of the first half of the optical synchronized N channel signal by a predetermined amount and cause the first and second halves of the synchronized N channel signals to be switched out of a second port of the WDM to the EDFA.

7. The optical regenerator of claim 6 wherein the NOLM further comprises a filter for blocking any of the optical clock output signal from the laser from propagating to the optical coupler of the NOLM after the phase of the first half signal has been shifted by a predetermined amount.

8. The optical regenerator of claim 6 wherein the NOLM further comprises:
- a first polarization controller coupled between the laser and the WDM; and
- a second polarization controller coupled between the optical coupler and the WDM of the NOLM, wherein the first and second polarization controllers provide a proper optical biasing of the optical fiber loop for stabilizing the NOLM when the optical fiber loop is not polarization independent.

9. The optical regenerator of claim 1 wherein the NOLM comprises:
- an optical fiber loop wherein at least a portion thereof comprises a high nonlinearity fiber;
- an optical coupler for receiving the optical synchronized N wavelength division multiplexed channel output signal from the signal synchronizing arrangement at a first port thereof, and for directing first and second halves of the received synchronized N channel output signal for propagation in first and second opposite directions, respectively, in the optical fiber loop; and
- a wavelength division multiplexer (WDM) for multiplexing the optical clock output signal from the laser with the first half of the optical synchronized N wavelength division multiplexed channel output signal from the signal synchronizing arrangement propagating in the first direction in the optical fiber loop in order to shift the phase of the first half of the optical synchronized N channel signal by a predetermined amount and cause the first and second halves of the synchronized N channel signals to be switched out of a second port of the WDM to the EDFA.

10. The optical regenerator of claim 9 wherein the NOLM further comprises a filter for blocking any of the optical clock output signal from the laser from returning to the optical coupler of the NOLM after the phase of the first half signal has been shifted by a predetermined amount.

11. The optical regenerator of claim 9 wherein the NOLM further comprises:
- a first polarization controller coupled between the laser and the WDM; and
- a second polarization controller coupled between the coupler and the WDM of the NOLM, wherein the first and second polarization controllers provide a proper optical biasing of the optical fiber loop for stabilizing the NOLM when the optical fiber loop is not polarization independent.

12. An optical regenerator for use in an optical transmission system comprising:
- an optical wavelength division demultiplexer (WDD) responsive to an optical input signal to the regenerator comprising N wavelength division multiplexed channels for directing the N channels onto separate N output paths, where $N \cdot 2$;
- a plurality of N–1 selectively changeable optical delays, each optical delay being coupled in a separate predetermined one of N–1 output paths of the WDD, and being responsive to a delay control signal for selectively adjusting the phase of the channel signal in an associated one of an N–1 output paths so that all N–1 optical channel signals are synchronized in phase with an Nth optical channel signal propagating in an output path not including an optical delay;
- an optical wavelength division multiplexer (WDM) for multiplexing the Nth optical channel signal and the N–1 optical channel signals from the plurality of N–1 optical delays into a synchronized N wavelength division multiplexed channel optical output signal;
- a phase controller responsive to a portion of the optical output signal from the WDM for detecting a phase difference between the Nth channel signal and each of the remaining N–1 delayed channel signals, and for generating a separate delay control signal to each of the optical delays for synchronizing the phase of each of the N–1 delayed optical channel signals to the phase of the Nth optical channel signal;
- an optical pulse retiming and reshaping arrangement comprising a nonlinear optical loop mirror (NOLM) arrangement which is responsive to the optical synchronized N wavelength division multiplexed channel output signal from the WDM for retiming and reshaping optical pulses of the optical synchronized N wavelength division multiplexed channels and for generating a corresponding optical NOLM output signal; and
- an Erbium-doped fiber amplifier (EDFA) responsive to the optical NOLM output signal for amplifying NOLM output signal, and for generating an amplified and phase-synchronized optical N wavelength division multiplexed channel output signal for transmission as an output signal from the optical regenerator.

13. The optical regenerator of claim 12 wherein the phase controller comprises:
- a wavelength division demultipexer (WDD) responsive to a portion of the optical output signal from the WDM for directing the N channels onto separate N output paths;
- a power splitter for splitting the power of a first one of the synchronized N wavelength division multiplexed optical channel signals into N–1 parts;
- a plurality of N–1 optical combiners, each combiner combining a separate one of the N–1 parts of the first one of the synchronized N wavelength division multiplexed optical channel signals from the power splitter for generating an optical output signal corresponding to the combined associated channel signals; and a plurality of N−1 filters, each filter being coupled to receive a separate one of the output signals from the plurality of N−1 combiners and to generate a phase error control signal as an output signal to a separate predetermined one of the plurality of N−1 selectively changeable optical delays.

14. The optical regenerator of claim 13 wherein the phase controller further comprises:

a plurality of N−1 photodetectors, each photodetector being coupled to receive a separate one of the optical output signals from the plurality of N−1 optical combiners and to convert said separate one of the optical output signal into a corresponding electrical signal; and the plurality of N−1 filters are N−1 bandpass filters, each bandpass filter being coupled to receive a separate one of the electrical signals from the plurality of N−1 photodetectors and to generate a phase error control signal as an output signal to a separate predetermined one of the plurality of N−1 selectively changeable optical delays.

15. The optical regenerator of claim 12 wherein the optical pulse retiming and reshaping arrangement further comprises:

a clock recovery circuit responsive to the predetermined Nth optical channel signal in the Nth output path from the WDD for generating a clock output signal having a frequency corresponding to the bit rate frequency of the predetermined Nth optical channel signal, and being responsive to the output signal from the EDFA for synchronizing the phase of the clock output signal to the phase of the amplified and phase-synchronized optical N wavelength division multiplexed channel in the output signal from the EDFA; and a laser responsive to the clock output signal from the clock recovery circuit for generating a corresponding optical clock output signal which is coupled into the NOLM.

16. The optical regenerator of claim 15 wherein the NOLM comprises:

an optical fiber loop wherein at least a portion thereof comprises a high nonlinearity fiber section;

an optical coupler for receiving the optical synchronized N wavelength division multiplexed channel output signal from the WDM at a first port thereof, and for directing first and second halves of the received synchronized N wavelength division multiplexed channel output signal for propagation in first and second opposite directions, respectively, in the optical fiber loop; and a wavelength division multiplexer (WDM) for multiplexing the optical clock output signal from the laser with the first half of the optical N channel signal propagating in the first direction in the optical fiber loop in order to shift the phase of the first half optical N channel signal by a predetermined amount and cause the first and second halves of the N channel signals to be switched out of a second port of the WDM to the EDFA.

17. The optical regenerator of claim 16 wherein the NOLM further comprises a filter for blocking any of the optical clock output signal from the laser from returning to the optical coupler after phase of the first half signal in the optical fiber loop has been shifted by a predetermined amount.

18. The optical regenerator of claim 16 wherein the NOLM further comprises:

a first polarization controller coupled between the laser and the WDM; and a second polarization controller coupled between the coupler and the WDM, wherein the first and second polarization controllers provide a proper optical biasing of the optical fiber loop for stabilizing the NOLM when the optical fiber loop is not polarization independent.

19. The optical regenerator of claim 12 wherein the NOLM comprises:

an optical fiber loop wherein at least a portion thereof comprises a high nonlinearity fiber;

an optical coupler for receiving the optical synchronized N wavelength division multiplexed channel output signal from the WDM at a first port thereof, and for directing first and second halves of the received synchronized N channel output signal for propagation in first and second opposite directions, respectively, in the optical fiber loop; and a wavelength division multiplexer (WDM) for multiplexing an optical clock output signal with the first half of the optical N channel signal from the WDM that is propagating in the first direction in the optical fiber loop in order to shift the phase of the first half signal by a predetermined amount and cause the first and second halves of the synchronized N channel signals to be switched out of a second port of the optical coupler of the NOLM to the EDFA.

20. The optical regenerator of claim 19 wherein the NOLM further comprises a filter for blocking any of the optical clock output signal from returning to optical coupler of the NOLM after the phase of the first half signal has been shifted by a predetermined amount in the optical fiber loop.

21. The optical regenerator of claim 19 wherein the NOLM further comprises:

a first polarization controller coupled between a source of the optical clock signal and the WDM; and a second polarization controller coupled between the coupler and the WDM, wherein the first and second polarization controllers provide a proper optical biasing of the optical fiber loop when the optical fiber loop is not polarization independent.

22. An optical regenerator for use in an optical transmission system comprising:

an optical N wavelength division multiplexed channel signal synchronizing arrangement responsive to the reception of an optical input signal to the regenerator comprising N wavelength division multiplexed channels for adaptively synchronizing the phase of all of the N channel signals relative to a predetermined one of the N channel signals, and for generating an optical synchronized N wavelength division multiplexed channel output signal, where N·2;

an optical pulse retiming and reshaping arrangement comprising:

a nonlinear optical loop mirror (NOLM) arrangement which is responsive to the optical output signal from the signal synchronizing arrangement for retiming and reshaping optical pulses of the N channel signals, and for generating a corresponding optical NOLM output signal;

a clock recovery circuit responsive to a predetermined one of the N channel signals propagating in the optical synchronizing arrangement for generating a clock output signal having a frequency corresponding to the bit rate frequency of the predetermined one of the N channel signals, and being responsive to an output signal from the optical regenerator comprising N phase-synchronized optical channel signals for synchronizing the phase of the clock output signal to the phase of the N channel signals in the output signal from the optical regenerator; and a laser responsive to the clock output signal from the clock recovery circuit for generating a corresponding optical clock output signal which is coupled into the NOLM; and an Erbium-doped fiber amplifier (EDFA) for amplifying the optical NOLM output signal, and for generating an amplified and phase-synchronized optical N wavelength division multiplexed channel output signal for transmission as the output signal from the optical regenerator.

23. The optical regenerator of claim 22 wherein the NOLM comprises:

an optical fiber loop wherein at least a portion thereof comprises a high nonlinearity optical fiber section;

an optical coupler for receiving the optical synchronized N wavelength division multiplexed channel output signal from the signal synchronizing arrangement at a first port thereof, and for directing first and second halves of the received synchronized N channel output signal for propagation in first and second opposite directions, respectively, in the optical fiber loop; and a wavelength division multiplexer (WDM) for multiplexing the optical clock output signal from the laser with the first half of the optical synchronized N wavelength division multiplexed channel output signal from the signal synchronizing arrangement propagating in the first direction in the optical fiber loop in order to shift the phase of the first half signal by a predetermined amount and cause the first and second halves of the N channel signals to be switched out of a second port of the WDM to the EDFA.

24. The optical regenerator of claim 23 wherein the NOLM further comprises a filter for blocking any of the optical clock output signal from the laser returning to optical coupler after the phase of the first half signal has been shifted by a predetermined amount in the optical fiber loop.

25. The optical regenerator of claim 23 wherein the NOLM further comprises:

a first polarization controller coupled between the laser and the WDM of the NOLM; and a second polarization controller coupled between the coupler and the WDM of the NOLM, wherein the first and second polarization controllers provide a proper optical biasing of the optical fiber loop for stabilizing the NOLM when the optical fiber loop is not polarization independent.

26. The optical regenerator of claim 22 wherein the optical N wavelength division multiplexed channel signal synchronizing arrangement comprises:

an optical wavelength division demultiplexer (WDD) responsive to the optical input signal to the regenerator for directing the N wavelength division multiplexed channels onto separate N output paths;

a plurality of N–1 selectively changeable optical delays coupled in predetermined N–1 output paths of the WDD, each optical delay being responsive to a delay control signal for selectively adjusting the phase of an associated one of N–1 optical channel signals so that all of the N–1 optical channel signals are synchronized in phase with an Nth optical channel signal not associated with an optical delay;

an optical wavelength division multiplexer (WDM) for multiplexing the Nth optical channel signal and the N–1 optical channel signals from the plurality of N–1 optical delays into a synchronized N wavelength division multiplexed channel optical output signal; and a phase controller responsive to a portion of the synchronized N wavelength division multiplexed channel output signal from the WDM for detecting a phase difference between the Nth channel signal and each of the N–1 delayed channel signals, and for generating a separate delay control signal to each of the optical delays for synchronizing the phase of each of the N–1 delayed optical channel signals to the phase of the Nth optical channel signal.

27. The optical regenerator of claim 26 wherein the phase controller comprises:

a wavelength division demultipexer (WDD) responsive to a portion of the synchronized N wavelength division multiplexed channel output signal from the WDM for directing the N channels onto separate N output paths;

a power splitter for splitting the power of a first one of the synchronized N wavelength division multiplexed optical channel signals into N–1 parts;

a plurality of N–1 optical combiners, each optical combiner combining a separate one of the N–1 parts from the power splitter and a separate one of the remaining second-to-N wavelength division multiplexed optical channel signals for generating an optical output signal corresponding to the combined associated channel signals; and a plurality of N–1 filters, each filter being coupled to receive a separate one of the output signals from the plurality of N–1 combiners and to generate a phase error control signal as an output signal to a separate predetermined one of the plurality of N–1 selectively changeable optical delays.

28. The optical regenerator of claim 27 wherein the phase controller further comprises:

a plurality of N–1 photodetectors, each photodetector being coupled to receive a separate one of the optical output signals from the plurality of N–1 optical combiners, and to convert said separate one of the optical output signal into a corresponding electrical signal; and the plurality of N–1 filters are N–1 bandpass filters, each bandpass filter being coupled to receive a separate one of the electrical signals from the plurality of N–1 photodetectors and to generate a phase error control signal as an output signal to a separate predetermined one of the plurality of N–1 selectively changeable optical delays.

29. A method of regenerating a received optical N wavelength division multiplexed channel signal in an optical regenerator of an optical transmission system, where N-2, comprising the steps of:

(a) concurrently and separately adaptively synchronizing the phase of all of the N channel signals in the received optical N wavelength division multiplexed channel signal relative to a predetermined one of the N channel signals for generating an optical output signal comprising N synchronized wavelength division multiplexed channel signals, where N·2;

(b) splitting the optical output signal from step (a) into two halves in an optical coupler so that a first half propagates in a first direction around an optical fiber loop wherein at least a portion thereof comprises a high nonlinearity optical fiber section and a second half propagates in a second opposite direction around the optical fiber loop;

(c) multiplexing an optical clock output signal from a laser with the first half signal propagating in the first direction in the optical fiber loop in step (b) in an optical wavelength division multiplexer for shifting the phase of the first half signal by a predetermined amount and causing the first and second halves of the N channel signals to be switched out of a second port of the optical coupler as a NOLM output signal when they return to the entry point of the optical fiber loop; and (d) amplifying the optical NOLM output signal in an Erbium-doped fiber amplifier (EDFA) for generating an amplified and phase-synchronized optical N wavelength division multiplexed channel output signal for transmission as an output signal from the optical regenerator.

30. The method of claim 29 wherein in performing step (a), performing the steps of:

(e) directing the N channel signals of the received optical N wavelength division multiplexed channel signal onto separate N output paths of an optical wavelength division demultiplexer (WDD);

(f) selectively adjusting the phase of each of N−1 optical channel signals in N−1 output paths of the WDD in separate one of a plurality of N−1 selectively changeable optical delays so that all of the N−1 optical channel signals are synchronized in phase with an Nth optical channel signal not associated with an optical delay;

(g) multiplexing the Nth optical channel signal and the N−1 optical channel signals from the plurality of N−1 optical delays into a synchronized N wavelength division multiplexed channel optical output signal in an optical wavelength division multiplexer (WDM);

(h) detecting a phase difference between the Nth channel signal and each of the N−1 delayed channel signals in the optical output signal from step (g) in a phase controller; and (i) generating a separate delay control signal from the phase controller to each of the optical delays for synchronizing the phase of each of the N−1 delayed optical channel signals to the phase of the Nth optical channel signal.

\* \* \* \* \*